Patented June 1, 1926.

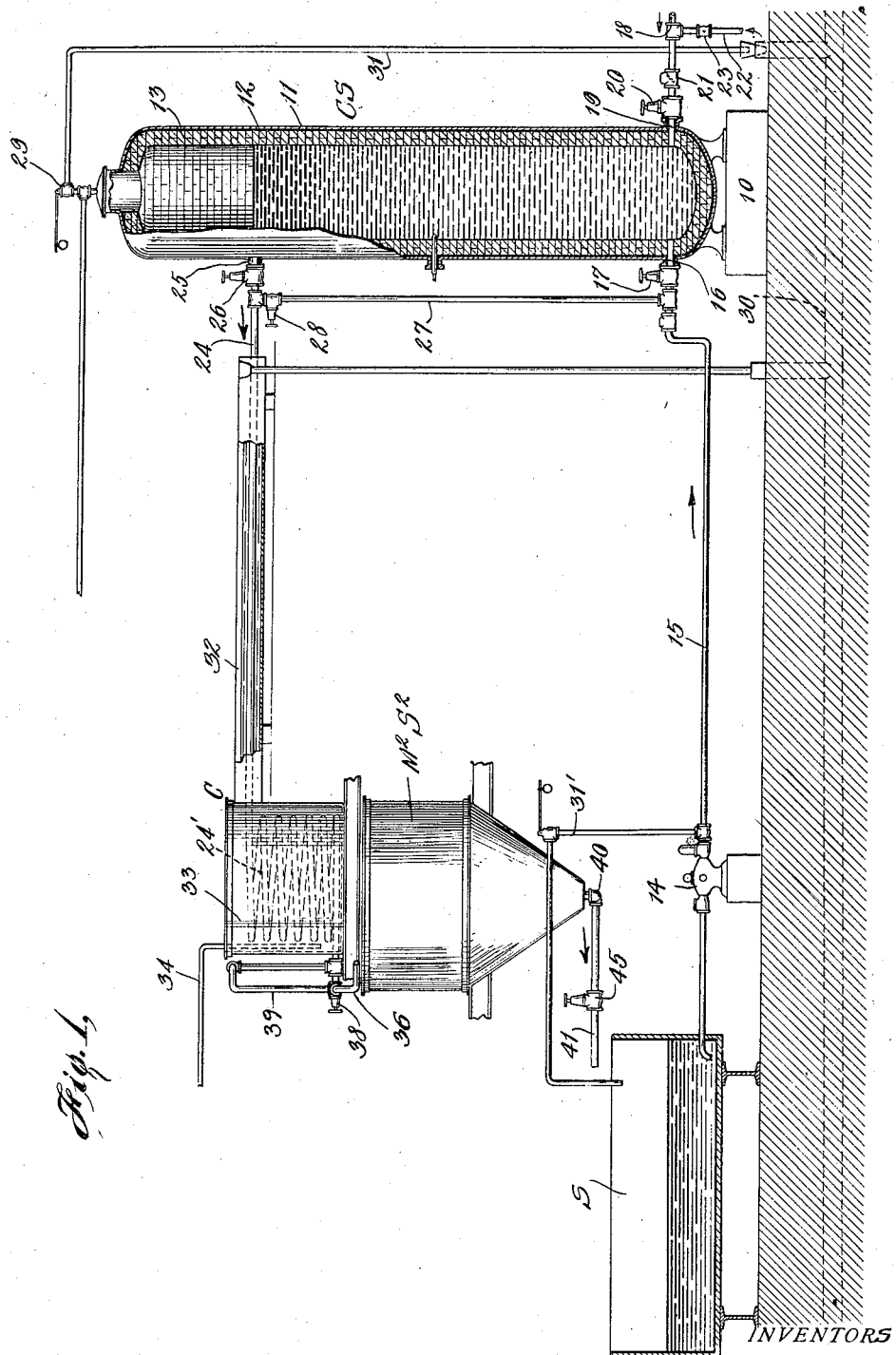

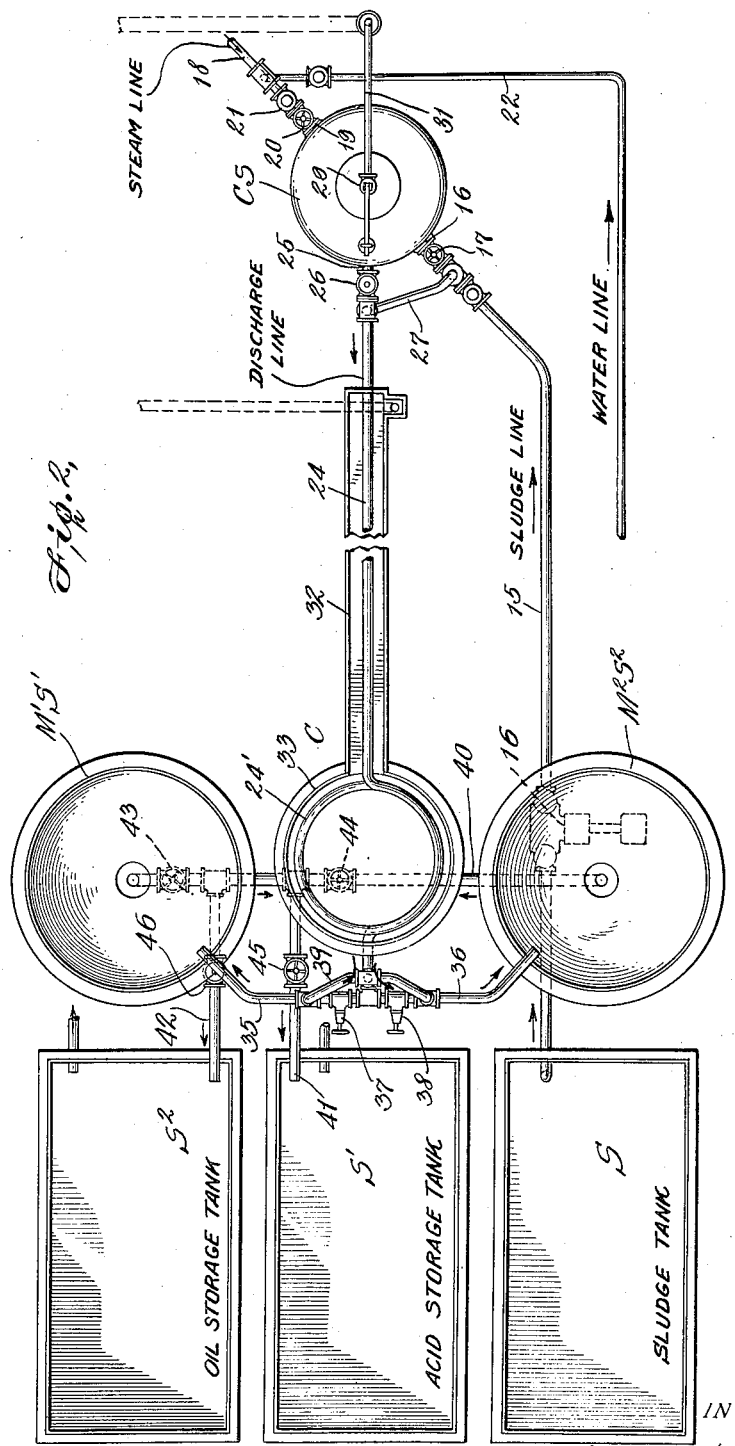

1,586,801

UNITED STATES PATENT OFFICE.

INGENUIN HECHENBLEIKNER AND THOMAS C. OLIVER, OF CHARLOTTE, NORTH CAROLINA.

METHOD OF AND APPARATUS FOR CONTINUOUSLY SEPARATING PETROLEUM SLUDGE.

Application filed March 20, 1923. Serial No. 626,272.

This invention relates to the recovering of the components of petroleum sludge obtained in the refining of petroleum oil, and more particularly to a method of and apparatus for effecting the separation of petroleum sludge into its hydrocarbon and acid constituents, and has special reference to the provision of such an apparatus and method in which the separation is practiced or carried on in a continuous manner.

In the refining of petroleum, crude petroleum oil or its fractional distillates is treated with sulphuric acid for absorbing the heavy hydrocarbons and other undesirable elements present in the oil; and as a result of this treatment there remains a sludge or acid tar which contains oil and other hydrocarbons combined with a diluted sulphuric acid. To recover the hydrocarbons and reclaim the acid, the sludge is first treated to effect a separation of its hydrocarbon and acid components, this being usually accomplished by subjecting a mixture of the sludge and water to the action of heat, or by digesting the sludge with steam, after which the so treated sludge is permitted to stand and settle to effect a physical separation of the oil constituent from the sulphuric acid, the former rising to the top and the latter gravitating to the bottom.

For producing the sludge separation, it has hitherto been proposed to digest the sludge with steam at relatively high temperatures and pressures, this resulting in the reclaiming of the oil constituent and the obtaining of the acid in a condition which permits of subsequent restoration to a purified and concentrated state with ease. In separating the sludge in accordance with this process, a vessel such as a tank or autoclave is first charged with the sludge, and in this vessel the sludge is digested with steam for an extended period of time until a regeneration of the sludge is obtained, after which the digested sludge is permitted to stand and settle to effect a mechanical separation of the sludge components which components are then separately removed from the vessel; and after the performance of this cycle of operation, the tank is refilled with a new charge for a repetition of the cycle. In the carrying out of this process, the time consumed in charging the tank, in effecting a settling of the components, and in emptying the tank, is comparatively great, and where eastern sludges are treated for example, the time of charging and emptying of the tank may objectionably consume about 50% of the period of a cycle of operation. Moreover, the periodic operation of the process entails repeated and constant attendance on the part of the operators, and therefore involves comparatively large labor costs. To obviate these objections incident to a periodic or cyclic process and provide a continuous pressure separation process is a prime desideratum of our present invention.

The principal objects of our present invention may be said to include the provision of a continuous method and the apparatus therefor for efficiently treating petroleum sludge at relatively high temperatures and pressures; the further provision of such a continuous method in which the sludge is subjected to internal heat treatment to provide heat and agitation at the temperatures and pressures desired; the more specific provision of a method in which chemical separation of the sludge into its components is continuously effected in one vessel and continuously fed to other vessels where mechanical separation of the sludge components is obtained; and the further provision of a method and apparatus of this nature which may be practiced and operated with great economy in time and labor and with increased efficiency and convenience.

To the accomplishment of the foregoing and such other objects as will hereinafter appear, our invention consists in the elements and their relation one to the other, as hereinafter particularly described and sought to be defined in the claims; reference being had to the accompanying drawings forming a part thereof, and in which:—

Fig. 1 is an elevational view with parts shown in section of a plant for carrying out the steps of our process, and Fig. 2 is a plan view thereof.

Before describing our process in detail, it may be briefly premised that in carrying out the steps of our process the petroleum sludge obtained as a product in the refining of petroleum oils is continuously fed into a vessel and there subjected to heat treatment under pressure to obtain a chemical regeneration or separation of the sludge into its hydrocarbon and acid components; and after undergoing this treatment the chemically separated components are continuously discharged from the vessel into a plurality of other vessels where the sludge components are permitted to stand for a time to obtain a physical or mechanical separation thereof, after which the hydrocarbon and acid components are separately discharged into storage tanks provided for this purpose.

Referring now to the drawings, we show the plant we prefer to employ in the practice of our process, the said plant comprising a vessel in the form of a chemical separator CS into which a stream of sludge is continuously fed for treatment in a manner as detailed hereinafter, and from which a continuous stream of chemically separated sludge is withdrawn or discharged and conducted through a cooling system generally designated as C, the chemically separated sludge stream being fed from this cooling system into other vessels comprising the mechanical separators M' S' or M² S², these mechanical separators being charged alternately so that the physical separation of the components in one separator may be obtained while the other separator is being charged. After the complete separation has been effected, the acid component which settles to the bottom of the mechanical separators is first led off into a storage tank S' and after the acid has been removed the hydrocarbon layer is discharged into an oil storage tank S².

The chemical separator CS of our invention preferably comprises a cylindrical vessel which is described and claimed in our copending application Ser. No. 625,675 filed March 16, 1923, the said vessel being supported on a foundation 10 and comprising a cylindrical steel shell 11 provided with an intermediate lead lining 12 and an inner or superposed masonry lining 13, the said masonry lining being preferably made of an acid-proof brick material and being provided for mechanically supporting the lead lining 11 and for preventing any chemical attack of the lead lining by the sludge acid at the high temperatures and pressures employed.

In the working of the process, the chemical separator CS is first charged with a mixture of petroleum sludge and water, and this mixture is subjected to the action of steam which is injected into the sludge mixture, the said mixture being agitated by the steam and heated to a temperature preferably about 360° F. at a pressure preferably about 6 atmospheres. The proportionate amounts of sludge, water and steam that may be used to make up a charge may be as follows: sludge 1050 gallons, water 300 gallons, steam corresponding to 150 gallons. The sludge mixture is digested with the steam for about 1 to 3 hours depending upon the character of sludge used, eastern sludges requiring, for example, less treatment than the western sludges, this treatment of the sludge mixture resulting in a chemical regeneration of the sludge components, which latter exists however in a mechanically intermixed state. After this treatment, our invention contemplates the introduction of continuous streams of sludge and steam into the heated regenerated sludge for obtaining a chemical separation of the introduced sludge, and a withdrawal of a continuous stream of separated sludge components equal in quantity to the sludge and steam streams introduced, the sludge components being continuously withdrawn or discharged from the chemical separator for mechanical separation.

For feeding a continuous stream of sludge into the chemical separator, there is provided a sludge line 15 leading from a sludge storage tank S, the sludge being forced from this tank by means of a pump 14 into the line 15 and thence into the bottom of the chemical separator through the inlet 16, a valve 17 being provided for controlling the flow of the sludge. For injecting a stream of steam into the chemical separator, there is provided a steam line 18 communicating with the chemical separator by way of the inlet 19, the said line being provided with a controlling valve 20 and if desired with a check valve 21. For introducing water into the sludge at the initial stage of the process, there is provided a water line 22 communicating with the steam line and controlled by a valve 23, the arrows in Fig. 1 indicating the respective directions of flow of the steam and water. The sludge and steam in the continuous operation of the process are simultaneously introduced and the flow thereof controlled so that the sludge will be digested for the desired period before withdrawal of the sludge components from the chemical separator.

For permitting the continuous discharge or withdrawal of the mechanically intermixed but chemically separated sludge components, there is provided the discharge line 24 communicating with the outlet 25 of the chemical separator, said outlet being located adjacent the top of the separator, a valve 26 being provided for controlling the flow of the discharging stream. If desired, the discharge line 24 may be connected with the sludge feed line 15 by means of the connecting line 27 controlled by the valve 28, this connecting line being closed during the normal operation of the apparatus, being opened when it is desired to discharge the complete contents of the chemical separator into the mechanical separators. Desirably the chemical separator is also provided with a safety valve 29 connecting to a drain pipe 30 by way of the drain line 31. Also for purposes of safety the sludge feed line 15 may be provided with the by pass safety line 31'.

As hereinbefore stated, the chemically separater sludge components are continuously fed from the chemical separator through the cooling system C to cool the components prior to discharging the same into the mechanical separators, the cooling system preferably comprising an elongated cooling trough 32 in which the feed line 24 is immersed and a cooling tank 33 in which the coiled extension 24' of the feed line is immersed, the said cooling tank being supplied with water through the water supply line 34.

After passing through the cooling system, the chemically separated sludge is then discharged into the mechanical separators alternately as hereinbefore mentioned, and to this end the coiled feed line 24' is connected to the oppositely directed charging lines 35 and 36 communicating respectively with the tops of the mechanical separators M' S' and M² S², the alternate flow of the sludge into the charging lines being controlled by means of the valves 37 and 38. If desired for purposes of safety, the feed line 24' may be additionally connected to the charging lines 35 and 36 by the inverted U piping 39 constructed to normally act as a trap and to act as a safety device under abnormal conditions of operation.

After a physical separation of the sludge components is effected in either of the mechanical separators, the acid and hydrocarbon layers are separately removed and discharged into the acid and oil storage tanks S' and S² respectively. To this end each of the mechanical separators is connected to each of the storage tanks, a convenient connecting means comprising a common line 40 leading from the bottom of each of the mechanical separators and two branch lines 41 and 42 leading respectively into the storage tanks S' and S², the flow from the mechanical separator M' S' into the branch lines being controlled by the valve 43, and the flow of the sludge components from the mechanical separator M² S² being controlled by means of the valve 44. In separating the physically divided components the acid is first conducted for discharge into the storage tank S', the flow being controlled by means of the valve 45 in the branch line 41, and when the hydrocarbon layer is reached this valve is closed and the valve 46 in the branch line 42 leading to the oil storage tank S² is opened, these valves being thus alternately controlled in conjunction with the valves 43 and 44 to obtain the complete separation.

The practice of our process and the operation of our plant will in the main be fully apparent from the above detailed description thereof. It will be apparent that after a body of sludge and water is first treated in the chemical separator and heated to the desired temperatures under the desired pressures, continuous streams of sludge and steam are introduced through the inlets 16 and 19 respectively, the sludge stream when injected into the chemical separator coming in direct contact with the heated body of separated sludge, the said stream intermixing with the injected steam to effect a conversion of the sludge into its constituents which gradually rises to the top of the chemical separator by displacement; and after a predetermined time of treatment the constituents discharge through the overflow outlet 25 into and through the cooling system C and into the mechanical separators where the completed physical separation is obtained. It will be further seen that by the provision of this continuous system the time element consumed in cyclic or intermittent processes in charging and emptying the separator is substantially eliminated and the output of the plant materially increased, and also that the wear and tear of the apparatus due to alternate cooling and heating of the same in cyclic processes is largely minimized. Moreover, it will be seen that the plant may be operated with facility and that the need for constant inspection and attendance is materially reduced and the plant operated with greater efficiency.

While we have shown our invention in the preferred form, it will be obvious that many changes and modifications may be made in the structure thereof, without departing from the spirit of the invention, defined in the following claims.

We claim:

1. In a continuous process of separating acid sludge obtained from the treatment of petroleum, the steps which consist in subjecting the acid sludge to the action of steam under pressure greater than atmospheric to obtain a chemical separation of the sludge into its hydrocarbon and acid components, in withdrawing from the acid sludge while under treatment the said components in a chemically separated but mechanically intermixed state, and in then effecting a physical separation of said components.

2. In a continuous process of separating acid sludge obtained from the treatment of petroleum, the steps which consist in internally heating a mixture of acid sludge and water at a high temperature under a pressure greater than atmospheric to obtain a chemical separation of the sludge into its hydrocarbon and acid components, in withdrawing from the acid sludge while under treatment the said components in a chemically separated but mechanically intermixed state, and in then effecting a physical separation of said components, 3. In a continuous process of separating acid sludge obtained from the treatment of petroleum, the steps which consist in subjecting the acid sludge to the action of steam at temperatures of about 360° F. under a pressure of about 6 atmospheres to obtain a chemical separation of the sludge into its hydrocarbon and acid components, in withdrawing from the acid sludge while under treatment the said components in a chemically separated but mechanically intermixed state, and in then effecting a physical separation of said components.

4. The process of separating acid sludge obtained from the treatment of petroleum which consists in heating a mixture of acid sludge and water at a high temperature under a high pressure to obtain a chemical separation of the sludge into its hydrocarbon and acid components, in withdrawing from the acid sludge while under treatment the said components in a chemically separated but mechanically intermixed state, and in introducing sludge and steam into the heated mixture for similar treatment and to replace the withdrawn components whereby the separation process is carried on continuously.

5. The process of separating acid sludge obtained from the treatment of petroleum which consists in heating a mixture of acid sludge and water at a temperature of about 360° F. under a pressure of about 6 atmospheres to obtain a chemical separation of the sludge into its hydrocarbon and acid components, in withdrawing from the acid sludge under treatment the said components in a chemically separated but mechanically intermixed state, and in introducing separate streams of sludge and steam into the treated mixture for similar treatment and to replace the withdrawn components whereby the separation process is carried on continuously.

6. The process of separating acid sludge obtained from the treatment of petroleum which consists in heating a mixture of acid sludge and water at a temperature of about 360° F. under a pressure of about 6 atmospheres to obtain a chemical separation of the sludge into its hydrocarbon and acid components, in withdrawing from the acid sludge mixture under treatment the said components in a chemically separated but mechanically intermixed state, and in introducing sludge and steam into the heated mixture and subjecting said sludge to the action of the steam at similar temperatures and pressures, the introduced sludge and steam replacing the withdrawn sludge components whereby the separation is carried on continuously.

7. The process of separating acid sludge obtained from the treatment of petroleum which consists in continuously intermixing streams of sludge and steam, in subjecting the sludge to the action of the steam at a high temperature and under a pressure greater than atmospheric to obtain a chemical separation of the sludge into its hydrocarbon and acid components, and in withdrawing from the acid sludge under treatment the said components in chemically separated but mechanically intermixed state.

8. The process of separating acid sludge obtained from the treatment of petroleum which consists in continuously intermixing streams of sludge and steam, in subjecting the sludge to the action of the steam at a temperature of about 360° F. and under a pressure of about 6 atmospheres to obtain a chemical separation of the sludge into its hydrocarbon and acid components, and in continuously withdrawing from the acid sludge under treatment the said components in chemically separated but mechanically intermixed state.

9. The process of separating acid sludge obtained from the treatment of petroleum which consists in continuously intermixing streams of sludge and steam, in subjecting the sludge to the action of the steam at a high temperature and under a high pressure to obtain a chemical separation of the sludge into its hydrocarbon and acid components, in withdrawing from the acid sludge while under treatment the said components in chemically separated but mechanically intermixed state, and in then effecting a physical separation of said components.

10. The method of separating acid sludge obtained from the treatment of petroleum which consists in internally heating a mixture of the sludge and water at a high temperature under a pressure greater than atmospheric to obtain a chemical separation of the sludge into its hydrocarbon and acid components, in simultaneously injecting continuously separate streams of sludge and steam into the heated sludge mixture, and in continuously withdrawing the separated components.

11. The continuous process of separating acid sludge obtained from the treatment of petroleum which consists in continuously introducing sludge and steam into a vessel for reaction at a temperature of about 360° F. under a pressure of about 6 atmospheres to obtain a chemical separation of the sludge into its hydrocarbon and acid components, and in withdrawing the said separated components from the said vessel during the treatment of said sludge.

12. The method of separating acid sludge obtained from the treatment of petroleum which consists in first charging a vessel with a mixture of sludge and water, in then subjecting said mixture to the action of steam to a temperature of about 360° F. at a pressure of about 6 atmospheres to obtain a chemical separation of the sludge into its hydrocarbon and acid components, in then continuously injecting into the treated mixture separate streams of sludge and steam, and in withdrawing from the mixture under treatment a continuous stream of separated sludge components.

13. An apparatus for effecting the chemical and mechanical separation of acid sludge obtained from the treatment of petroleum comprising a pressure autoclave operative for effecting a chemical separation of the acid sludge into its hydrocarbon and acid components, separate inlet ducts adjacent the bottom of said autoclave for injecting streams of steam and sludge into the autoclave for treatment to effect a chemical separation of the sludge into its components, and an outlet overflow duct adjacent the top of the autoclave for withdrawing the said sludge components for further treatment.

14. An apparatus for effecting the chemical and mechanical separation of acid sludge obtained from the treatment of petroleum comprising a closed pressure chemical separator operative for treating the acid sludge at a relatively high temperature and pressure for effecting a continuous chemical separation of the sludge into its hydrocarbon and acid components, a plurality of mechanical separators arranged to be charged alternately from said chemical separator, and means connecting the separators for feeding the said components continuously from the chemical separator and alternately into the mechanical separators.

15. An apparatus for effecting the chemical and mechanical separation of acid sludge obtained from the treatment of petroleum comprising a closed pressure chemical separator operative for effecting a chemical separation of the acid sludge into its hydrocarbon and acid components, a plurality of mechanical separators arranged to be charged alternately from said chemical separator, and means connecting the separators for feeding the said components continuously from the chemical separator and alternately into the mechanical separators, the said means including provisions for cooling the sludge components in transit.

16. An apparatus for effecting the chemical and mechanical separation of acid sludge obtained from the treatment of petroleum comprising a closed pressure chemical separator operative for effecting a chemical separation of the acid sludge into its hydrocarbon and acid components, a plurality of mechanical separators arranged to be charged alternately from said chemical separator, means connecting the separators for feeding the said components continuously from the chemical separator and alternately into the mechanical separators, storage reservoirs for the separated hydrocarbon and acid components, and means connecting each of said reservoirs with each of said mechanical separators.

Signed by the said INGENUIN HECHENBLEIKNER at Charlotte, in the county of Mecklenburg and State of North Carolina, this 12th day of March A. D. 1923.

INGENUIN HECHENBLEIKNER.

Signed by the said THOMAS C. OLIVER at New York, in the county of New York and State of New York, this 15th day of March, 1923.

THOMAS C. OLIVER.